UNITED STATES PATENT OFFICE 2,238,209

ANTHRAQUINONE-BENZACRIDONE VAT DYESTUFFS

Wilhelm Bauer, Leverkusen-Wiesdorf, and Bernhard Bollweg, Leverkusen-I. G.-Werk, Germany, assignors to General Aniline & Film Corporation, a corporation of Delaware No Drawing. Application April 18, 1939, Serial No. 268,528. In Germany May 27, 1938

1 Claim. (Cl. 260—277)

The present invention relates to new vat dyestuffs of the anthraquinone series.

We have found that vat dyestuffs corresponding to the general formula:

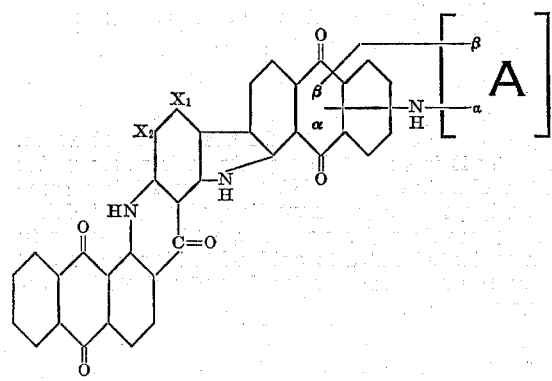

wherein A stands for anthraquinone, the linkages of the imino group between the two anthraquinones are attached to α-positions and the second linkage to adjacent β-positions, $X_1$ stands for hydrogen or halogen and $X_2$ stands for hydrogen, alkyl, alkoxy, aryloxy or halogen represent valuable vat dyestuffs. It is to be pointed out that the general formula given above and in the appended claim is considered to cover also compounds in which an anthraquinoneacridonecarbazole radical is linked on the anthraquinone A. The new compounds represent dark powders which dissolve in concentrated sulfuric acid with a blue violet color and which dye vegetable fibers from a bordo-red vat in very fast clear yellowish-brown to olive-brown and red-brown shades. They are especially distinguished by a great affinity to the vegetable fiber.

The process for the manufacture of the new dyestuffs consists in condensing by means of acid condensing agents in the presence of a suitable organic or inorganic solvent anthraquinone-2.1-N-1'.2'-N-benzacridones, which are substituted in Bz6'-position by an α-amino-1.1'-dianthrimide radical or by an α-amino-1.1'-anthrimidecarbazole radical and which do not possess in ortho-position to the anthrimide nitrogen atoms substituents which prevent ring formation. If necessary, the reaction products may be subjected to an aftertreatment with oxidizing or aroylating agents.

As acid condensing agents there have proved especially suitable anhydrous aluminum chloride in the presence of, for instance, nitrobenzene or sulfur dioxide. When started from anthraquinone-2.1-N-1'.2'-N-benzacridones the Bz6'-position of which is substituted by an α-amino-1.1'-dianthrimide radical, for instance, a compound of the following type:

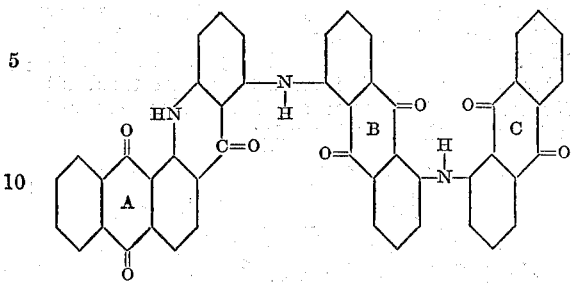

then carbazolization occurs between the Bz-nucleus and the aminoanthraquinone radical in 6'-position as well as between the two anthraquinone radicals B and C. The carbazole ring formation takes place at temperatures between 70 and 90° C. very easily. At first intermediate products with a higher hydrogen content are obtained which, by a treatment with oxidizing agents, for instance, chlorine lye, are converted into the corresponding final products. In case aroyl radicals have been split off during the condensation or starting materials have been employed bearing free amino groups, the carbazoles may be subsequently aroylated by heating with acid chlorides.

The starting materials employed may be obtained, for instance, by causing to act with α-amino-1.1'-dianthrimides or α-amino-1.1'-anthrimidecarbazoles upon Bz6'-halogenanthraquinone-2.1-N-1'.2'-N-benzacridones or by the reaction of Bz6'-aminoanthraquinone-2.1-N-1'.2'-N-benzacridones upon α-halogen-1.1' dianthrimides or the carbazoles thereof. A further method consists in replacing the Bz6'-position of an acridone by an α-aminoanthraquinone radical containing in a further α-position a free amino group or a halogen and acting with this compound upon an α-halogen, α-aminoanthraquinone respectively.

The following examples illustrate our invention without, however, restricting it thereto, the parts being by weight:

Example 1

24 parts of 1.5-diaminoanthraquinone, 40.5 parts of 3'.6'-dichloroanthraquinone-2.1-N-1'.2'-N-benzacridone, 7.5 parts of anhydrous potassium carbonate, 2 parts of copper acetate and 800 parts of naphthalene are heated at 190–200° C. for 2–3 hours while vigorously stirring. Then 38 parts of 1-chloro-5-benzoylaminoanthraquinone, 8 parts of anhydrous potash and 2 parts of copper acetate are added and heated at 210° C. while stirring for 5 hours. When cool the product is diluted with chlorobenzene and filtered with suction in the heat. The precipitate is washed in the following order with chlorobenzene, then with some acidified water to remove the inorganic salts, and finally with hot water and dried. The trianthrimide thus obtained dissolves in concentrated sulfuric acid with an orange-red color. Violet flakes, yielding a current-colored vat and dyeing the fiber dull violet shades, separate by pouring the solution into water.

For effecting condensation 80 parts of the trianthrimide are stirred into a solution of 200 parts of anhydrous aluminium chloride in 800 parts of nitrobenzene at 60° C. An olive-green solution is formed with faint evolution of heat. A test portion diluted with alcohol turns black. The whole is heated and the flame so regulated that within half an hour a temperature of 90° is reached, whereby hydrochloric acid is evolved and kept at this temperature for ¾ hour. The color of the melt turns greenish-blue and a test portion diluted with alcohol turns bright blue-violet. When cool, the melt is poured into ice-water, and then distilled with steam until all nitrobenzene has been expelled. The dyestuff having the following formula:

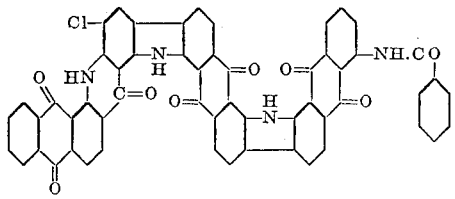

is finely distributed in water and oxidized after adding some caustic soda lye with an excess of chlorine lye, sucked off, washed and dried. It represents a dark powder, which dissolves in concentrated sulfuric acid with blue color. By pouring into water the solution brown flakes are separated. The dyestuff yields an easily soluble bordo-red vat with an alkaline hydrosulfite solution, which dyes the vegetable fiber clear, pure brown shades of excellent fastness properties.

A similar dyestuff is obtained by treating the above-mentioned trianthrimide after the process of application Ser. No. 229,328 to an acid condensation.

*Example 2*

A product identical with the above-mentioned dyestuff is obtained by heating 18.7 parts of 3'-chloro-6'-amino-anthraquinone-2.1-N-1'.2'-N-benzacridone, 14 parts of 1.5-dichloroanthraquinone, 4 parts of potassium carbonate, 1 part of copper acetate, 400 parts of naphthalene to 195–200° C. for 2½ hours with stirring, then adding 18 parts of 1-amino-5-benzoylaminoanthraquinone, 4 parts of potash and 1 part of copper acetate and heating to 210° C. for 4 hours. The trianthrimide is worked up and condensed with aluminium chloride as described in Example 1.

*Example 3*

19.5 parts of 3'-methoxy-6'-chloroanthraquinone-2.1-N-1'.2'-N-benzacridone, 12 parts of 1.5-diaminoanthraquinone, 3.7 parts of potassium carbonate, 1 part of copper acetate and 400 parts of naphthalene are heated to 200° C. for 2 hours with stirring. Then 18.5 parts of 1-chloro-5-benzoyl-aminoanthraquinone, 4 parts of potassium carbonate and 1 part of copper acetate are added and heated at 210° C. for 5 hours with stirring. After diluting with chlorobenzene, the precipitate is sucked off in the heat and washed in the usual manner with organic solvents subsequently with acidified water, and finally with hot water and dried. The trianthrimide represents a dark powder, soluble in concentrated sulfuric acid with a yellowish-brown color. Dull violet flakes separate by pouring the solution into water.

For effecting condensation 30 parts of the trianthrimide are added to a solution of 80 parts of aluminium chloride in 300 parts of nitrobenzene. Heat is evolved the temperature rising to 50–80° C. The melt is maintained for about half an hour at 80° C. The solution is at first olive, then it turns green. A small test portion diluted with alcohol shows in the beginning of the condensation a blue, and at the end a blue-violet color. When cool the melt is poured into ice-water, the nitrobenzene is distilled with steam and the dyestuff having the following constitution:

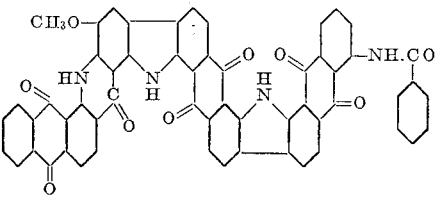

is filtered with suction and rinsed with hot water. Finally it is stirred to a paste with warm water with chlorine lye, oxidized after adding some soda lye, filtered with suction, rinsed and dried. It represents a dark powder, which dissolves in concentrated sulfuric acid with blue color and dyes the fiber from a bordo-red vat fast olive-brown shades.

*Example 4*

15.2 parts of 5.5'-diamino-1.1'-dianthrimide-carbazole (obtained by reaction of 1-amino-5-benzoylaminoanthraquinone with 1-chloro-5-benzoylaminoanthraquinone, acid condensation as described in German Patent 239,544 and splitting off the two benzoyl residue with weakly diluted sulfuric acid), 13 parts of 3'.6'-dichloroanthraquinone-2.1-N-1'.2'-N-benzacridone, 2.5 parts of potassium carbonate, 0.75 part of copper acetate and 200 parts of naphthalene are heated to boiling for 20 hours with stirring. Then the melt is diluted with o-dichloro-benzene, the dyestuff filtered with suction in the heat and the precipitate washed in the usual manner. It dyes the fiber from a brown vat currant shades.

For effecting condensation 25 parts of the above mentioned dyestuff are stirred into a solution of 75 parts of aluminium chloride in 250 parts of nitrobenzene and heated to 100–110° for one hour. Then the nitrobenzene is distilled off with steam and the dyestuff separated, washed and dried. It contains a free amino group. For aroylating the amino group, 25 parts of the finely powdered product are heated with 250 parts of nitrobenzene and 15 parts of β-naphthoyl chloride at 180–200° C. for 2 hours, until evolution of hydrochloric acid has ceased. The dyestuff is sucked off in the heat, washed and dried. It has the following constitution:

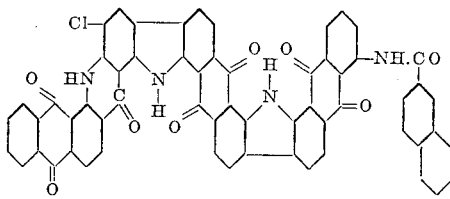

It represents a dark brown powder, which dissolves in concentrated sulfuric acid with a greenish-blue color. Brown flakes separate by pouring the solution into water. The dyestuff dyes the fiber from a bordo-red vat yellow-brown shades of excellent fastness properties.

*Example 5*

9 parts of 5.5'-diamino-1.1'-dianthrimidecarbazole (compare Example 4), 16 parts of 4'.6'-dichloroanthraquinone-2.1 - N - 1'.2'-N-benzacridone, 3 parts of potassium carbonate, 0.5 part of copper acetate and 200 parts of naphthalene are heated to 210° C. for 10 hours with stirring. Then the melt is diluted with chlorobenzene, filtered with suction in the heat in the usual manner and dried. For effecting condensation 21 parts of the trianthrimide are added to a solution of 70 parts of aluminium chloride and 210 parts of nitrobenzene and heated to 90° C. for 2 hours, whereby the color of the solution turns from olive to green-blue. The nitrobenzene is distilled with steam and the dyestuff, which has the following constitution:

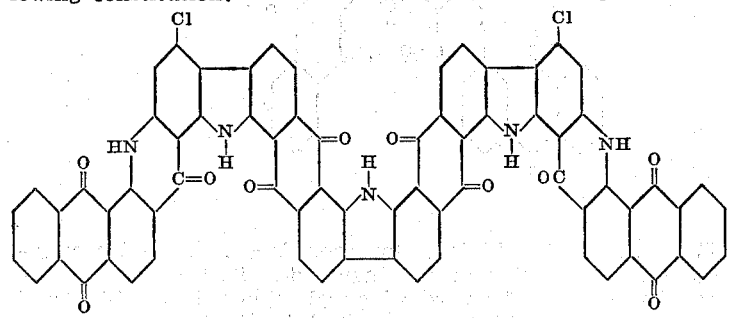

is separated in the usual manner, finely dispersed, oxidized with alkaline chlorine lye, filtered with suction, washed and dried. It represents a dark brown powder, the hydrosulfite vat of which possesses a great affinity for the vegetable fiber. It dyes cotton in very fast, clear reddish-brown shades.

*Example 6*

25 parts of 5-amino-1.1'-dianthrimidecarbazole (obtained by carbazolization of the reaction product of 1 - amino-5-benzoylaminoanthraquinone with 1-chloroanthraquinone, described in German Patent 451,495, and splitting off the benzoyl group by heating with weakly diluted sulfuric acid), 25 parts of 3'.6'-dichloroanthraquinone-2.1-N-1'.2'-N-benzacridone, 5 parts of potassium carbonate, 1 part of copper acetate and 300 parts of naphthalene are heated to 205° C. for 22 hours with stirring. Then the melt is diluted with chlorobenzene, the precipitate filtered with suction in the heat, washed and dried. The red-brown sulfuric acid solution separates grey-brown flakes, when diluted with water. For effecting condensation 39 parts of the dianthrimide are heated with a solution of 120 parts of aluminium chloride in 400 parts of nitrobenzene for 1¼ hours at 100° C., whereby the color of the solution turns from brown-red to a clear greenish-blue. The dyestuff, which has the following constitution:

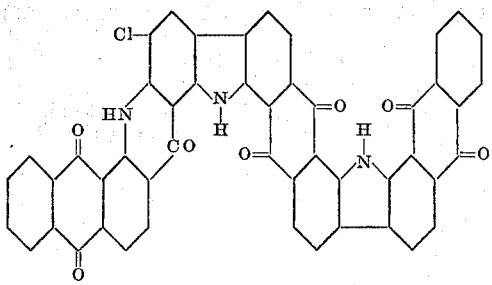

is separated in the usual manner, oxidized with alkaline chlorine lye, filtered with suction, rinsed and dried. It dyes from a bordo-red vat fast yellowish-brown shades.

*Example 7*

18 parts of 5-amino-4'-benzoylamino-1.1'-anthrimidecarbazole (German Patent 491,428), 13.5 parts of 3'-methoxy-6'-chloroanthraquinone-2.1-N-1'.2'-N-benzacridone, 2.5 parts of potassium carbonate, 0.5 part of copper acetate and 200 parts of naphthalene are heated at 210° C. for 10 hours. The melt is diluted with o-chlorobenzene, the reaction product filtered with suction in the heat, washed and dried in the usual way. The brown-red solution in concentrated sulfuric acid separates, when diluted with water, olive-grey flakes. For effecting condensation 23 parts of the anthrimide are heated with a solution of 46 parts of aluminium chloride in 200 parts of nitrobenzene at 75–80° C. for one hour, until a small test portion diluted with alcohol has been turned from green-blue to violet-blue. The dyestuff of the following formula:

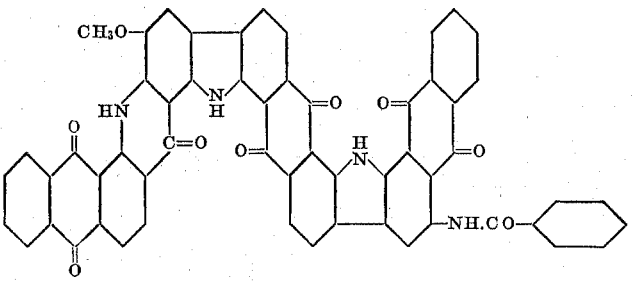

is separated in usual manner. It dissolves in concentrated sulfuric acid with a dull violet color. The solution separates when diluted with water brown flakes. The product yields from a bordo-red vat deep, reddish-brown shades of very good fastness properties.

*Example 8*

12 parts of 1.4-diaminoanthraquinone, 20 parts of 3'.6'-dichloroanthraquinone-2.1 - N - 1'.2' - N-benzacridone, 3.7 parts of anhydrous potassium carbonate and 1 part of copper acetate are stirred into 400 parts of naphthalene at 180–200° C. for 2 hours. After forming the anthrimide, 18.5 parts of 1-chloro-4-benzoylaminoanthraquinone, 4 parts of potassium carbonate and 1 part of copper acetate are added. After stirring for 5 hours at 215° C. the melt is diluted with chloro-benzene, the dianthrimide is filtered with suction, washed with chloro-benzene and pyridine, extracted by boiling with diluted hydrochloric acid, filtered with suction, washed and dried.

is filtered with suction, finely dispersed and then oxidized with diluted warm chlorine lye in a weakly alkaline solution, filtered with suction, washed and dried. It dyes cotton from the vat currant-colored shades.

Example 9

The dyestuff of the following constitution:

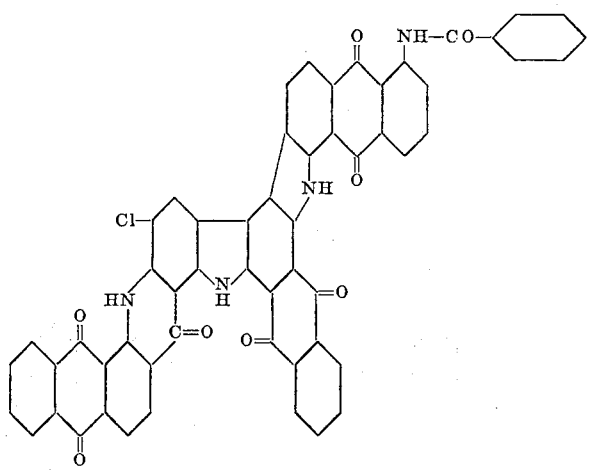

For effecting condensation 20 parts of the anthrimide in a solution of 50 parts of aluminium chloride are stirred in 300 parts of nitrobenzene at 140° C. for several hours. The progress of the reaction may be determined by tests which are diluted with alcohol. At the beginning they show a pure blue, at the end a dull bluish-red color. The melt is worked up by pouring into diluted hydrochloric acid, the nitrobenzene distilled with steam, the dyestuff of the following constitution:

is obtained by replacing 1-chloro-4-benzoylaminoanthraquinone, described in Example 8, by 1-chloro-5-benzoylamino-anthraquinine and working as described in the above-mentioned example. It dyes cotton from the vat reddish-currant shades.

Example 10

A dyestuff of the following formula:

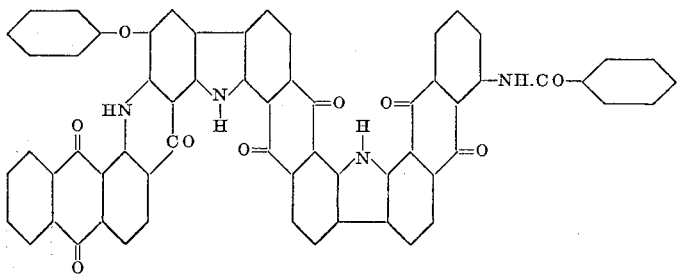

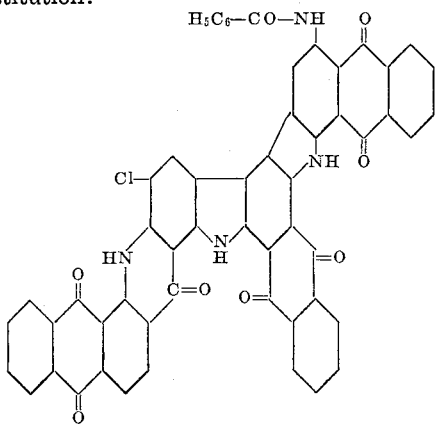

is obtained by replacing in Example 3 the 3'-methoxy -6'-chloroanthraquinone-2.1-N-1'.2'-N-benzacridone by the equivalent quantity of 3'-phenoxy-6'-chloroacridone (obtained by causing to react 2-phenoxy-5-chloroaniline with 1-chloro-anthraquinone-2-carboxylic acid and conversion of the thus obtained 2'-phenoxy-5'-chloro-1-anilidoanthraquinone-2-carboxylic acid into the acridone by heating for 1½ hours with the same quantity benzoyl chloride in o-dichlorobenzene at 150°) and acting as described in Example 3. It represents a black powder, which dissolves in concentrated sulfuric acid with a grey-blue color and dyes the fiber from a bordored vat yellowish-brown shades.

Example 11

The dyestuff of the following formula:

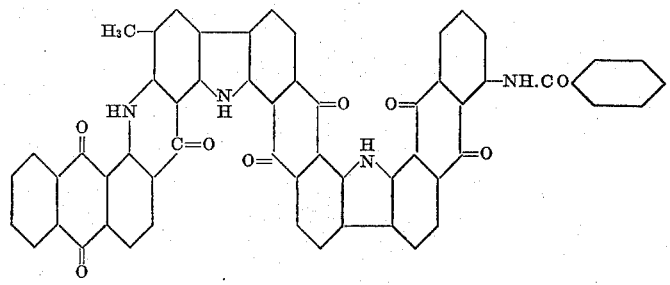

is obtained by replacing in Example 1 the 3'-chloro-6'-chloroanthraquinone-2.1-N-1'.2'-N-benzacridone by the equivalent quantity of 3'-methyl-6'-chloroacridone (compare Example 6 of German Patent 619,080). It represents a dark-brown powder, which dissolves in concentrated sulfuric acid with a greenish-blue color and dyes cotton from a bordo-red vat deep, yellowish-brown shades of excellent fastness properties.

Example 12

A dyestuff of the following formula:

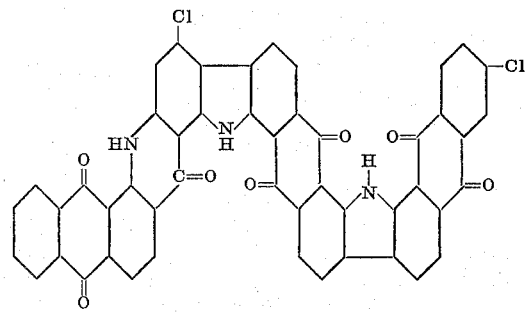

is obtained when replaced in Example 6 the 5-amino-1.1'-dianthrimidecarbazole by the equivalent quantity of 5-amino-6'-chloro-1.1'-dianthrimidecarbazole (obtained by conversion of the 1-amino-6-chloroanthraquinone with 1-chloro-5-benzoylaminoanthraquinone, carbazolization of the anthrimide after the process of German Patent 451,495 and splitting off the benzoyl group by heating with weakly diluted sulfuric acid) and used instead of the 3'.6'-dichloroanthraquinone-2.1-N-1'.2'-N-benzacridone the same quantity of 4'.6'-dichloroanthraquinone-2.1-N-1'.2'-N-benzacridone. It yields from a bordo-red fast yellow-brown shades.

We claim:

A vat dyestuff having the formula:

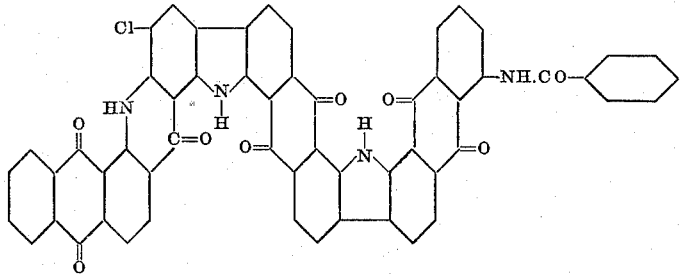

which product is a dark powder dissolving in concentrated sulfuric acid to a blue solution, yielding a bordo-red vat and dyeing vegetable fibers from the vat fast, clear, pure, brown shades.

WILHELM BAUER.
BERNHARD BOLLWEG.